US 8,492,985 B2

(12) United States Patent
Sato

(10) Patent No.: US 8,492,985 B2
(45) Date of Patent: Jul. 23, 2013

(54) DISCHARGE LAMP LIGHTING APPARATUS

(75) Inventor: Naohito Sato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 63 days.

(21) Appl. No.: 13/386,148

(22) PCT Filed: Oct. 30, 2009

(86) PCT No.: PCT/JP2009/005797
§ 371 (c)(1),
(2), (4) Date: Jan. 20, 2012

(87) PCT Pub. No.: WO2011/052019
PCT Pub. Date: May 5, 2011

(65) Prior Publication Data
US 2012/0126715 A1   May 24, 2012

(51) Int. Cl.
*H05B 37/02*   (2006.01)
*H05B 39/04*   (2006.01)
*H05B 41/36*   (2006.01)

(52) U.S. Cl.
USPC ......... 315/224; 315/209 R; 315/291; 315/307

(58) Field of Classification Search
None
See application file for complete search history.

(56) References Cited

U.S. PATENT DOCUMENTS

| 6,683,420 | B2 | 1/2004 | Bens et al. |
| 7,327,096 | B2 | 2/2008 | Mönch et al. |
| 7,482,762 | B2 * | 1/2009 | Fukuda et al. ............... 315/291 |
| 2002/0175636 | A1 * | 11/2002 | Kawasaka et al. ........... 315/224 |
| 2008/0088253 | A1 | 4/2008 | Bonigk |
| 2009/0231554 | A1 | 9/2009 | Soma et al. |
| 2011/0221357 | A1 | 9/2011 | Braun et al. |

FOREIGN PATENT DOCUMENTS

| DE | 102005004916 A1 | 8/2006 |
| JP | 8-8087 A | 1/1996 |
| JP | 2002-352973 A | 12/2002 |
| JP | 2005-209410 A | 8/2005 |
| JP | 2009-158324 A | 7/2009 |
| WO | WO 2010/045980 A1 | 4/2010 |

* cited by examiner

*Primary Examiner* — Ahn Tran
(74) *Attorney, Agent, or Firm* — Birch, Stewart, Kolasch & Birch, LLP

(57) ABSTRACT

A discharge lamp lighting apparatus has a configuration including a control unit which discriminates, for each polarity of an AC rectangular wave output, the output voltage detected with an output voltage detector for detecting the voltage applied to a discharge lamp, and carries out constant power control for each polarity separately. By thus detecting the output voltage for each polarity separately and by outputting a target current for each identical polarity, it can carry out constant power control positively even if the output voltage varies for each polarity, thereby being able to prevent current feedback to a different polarity, and to prevent power oscillation and partial reduction of electrodes due to an increase of the output voltage difference for each polarity.

9 Claims, 16 Drawing Sheets

DISCHARGE LAMP LIGHTING APPARATUS

TECHNICAL FIELD

The present invention relates to a discharge lamp lighting apparatus of a discharge lamp such as a metal halide lamp used as headlights of a vehicle such as a car, and of a discharge lamp (HID) lit by an AC rectangular wave, which is used as an illuminating lamp in indoor or outdoor facilities, factories or the like or used as a streetlight.

BACKGROUND ART

As for a headlight of a vehicle, a cheap and stable light source is required. In particular, to implement a stable light source, it is desirable to light stably without illuminance variation. Since illuminance is in proportion to power, a general method of achieving stable lighting is to supply constant power. However, owing to individual differences in characteristics of discharge lamps, or to variations in the life due to electrode wear or in pressure conditions in a light-emitting tube, since the voltage of a discharge lamp varies, a technique is required to achieve constant power control independently of the discharge lamp voltage.

As a prior art for achieving the constant power control of the discharge lamp, there is Patent Document 1. The prior art detects output voltage, calculates a target current=target power/output voltage, and carries out feedback using the target current calculated, thereby achieving constant power control accurately with a configuration simpler than that when carrying out feedback using power. In addition, by providing a delay circuit for the target current output, it alters the target current by a time constant comparable to a transient change in the discharge lamp voltage, thereby preventing power oscillation.

PRIOR ART DOCUMENT

Patent Document

Patent Document 1: Japanese Patent Laid-Open No. 8-8087/1996.

DISCLOSURE OF THE INVENTION

The conventional example, however, considers only carrying out stable constant power control for the transient change in the discharge lamp voltage. The discharge lamp voltage is decided by a voltage drop in electrodes, the path of the arc, the pressure in the light-emitting tube and the like. As for the individual difference of the discharge lamp and the transient change in the pressure in the light-emitting tube, the conventional example can cope with them. The conventional example, however, does not consider a case where the path of the arc or the voltage drop in the electrode differs depending on polarity. To prevent partial reduction in the electrodes and to achieve stable lighting, the discharge lamp requires AC lighting. However, if arc spots (bright spots) where the arc starts become asymmetric on the positive and negative electrodes, for example, the path of the arc can sometimes differ between the positive and negative polarities. When the path of the arc steadily differs between the positive and negative polarities, the output voltage differs between the positive and negative polarity as well. In addition, if the voltage drop differ between the positive and negative electrodes, the output voltage also differs between the positive and negative polarities.

If the target current of the reversed polarity varies with respect to the output voltage of a given polarity owing to the delay circuit of the target current output of the conventional example, this will increase difference between the output voltages of the respective polarities, thereby being possible to cause power oscillation leading to the illuminance unstability, or power unbalance between the polarities leading to partial reduction in electrodes.

In addition, the discharge lamp or DC/DC converter can become a noise source, which sometimes brings about mixing of noise into the detecting circuit of the output voltage. Since the actual output voltage does not vary, the target current must not vary as well. However, the mixing of noise into the output voltage detected will cause the target current to vary in response to it in the conventional example, thereby being possible to cause the illuminance to vary or go out.

In addition, in a discharge lamp in the last stage of life with its electrodes being worn, the arc spot varies and a phenomenon can sometimes occur which is called abnormal discharge in which the output voltage increases but the illuminance gets dark. Although the output voltage increases if the abnormal discharge occurs, it is desirable that the output current be maintained in order to keep the illuminance and to recover from the abnormal discharge quickly. In the conventional example, however, since the target current reduces against the increase in the output voltage at the abnormal discharge, it is likely that the illuminance gets dark and becomes increasingly unstable because the abnormal discharge continues.

In addition, in the initial stage of lighting of the discharge lamp, arc conditions can vary because of a transient change in the pressure in the light-emitting tube or in the electrode temperature. For example, when shifting from the diffusion mode to spot mode, the output voltage reduces and the illuminance increases. In this case, to make the illuminance variation less conspicuous, it is desirable that the current variation be slower. In the conventional example, however, since it increases the target current at a fixed time constant against the reduction in the output voltage, the illuminance increases more and more, thereby making the illuminance variation more conspicuous.

In addition, there are some cases in which the output voltage varies because of other than the transient change, noise, abnormal discharge or the like. When the discharge lamp vibrates, the path of the arc varies because of changes in pressure distribution or the like in the light-emitting tube. At that time, although the output voltage varies as well, the illuminance does not vary unlike the case of the abnormal discharge or mode change of the arc. Accordingly, with respect to the output voltage variation due to vibration, it is desirable that the constant power be maintained by quickly changing the target current.

However, since the time constant of the delay circuit is arbitrary in the conventional example, if it sets the time constant at a large value because of the foregoing problem, the change of the target current delays with respect to the output voltage variation at the vibration, which is likely to make the power and illuminance unstable.

Regarding these problems, if the time constant is made sufficiently small for the delay circuit of the target current output of the conventional example, the target current varies in real time with respect to the vibration or the output voltage difference for each polarity, thereby being able to prevent the power unbalance between the polarities or the power variation at the vibration. However, since the target current varies in real time for the noise or abnormal discharge, a problem arises in that the power or illuminance becomes unstable.

On the other hand, if the time constant is made sufficiently large, the target current varies slowly for the noise or abnormal discharge and the power or illuminance becomes stable. However, since the target current does not vary even for the output voltage difference for each polarity or the vibration, a problem arises of the power unbalance for each polarity or the power variation at the vibration. Furthermore, since the target current variation delays with respect to the transient change in the output voltage in the initial stage of lighting, it is possible that the power becomes unstable and the original object cannot be achieved.

The present invention is implemented to cope with all the conventional problems. It can prevent the oscillation of the output power due to the output voltage difference for each polarity or the partial reduction in the electrodes by detecting the output voltage for each polarity and by carrying out constant power control for each identical polarity.

In addition, it can maintain the current against the noise or abnormal discharge by calculating the average of the output voltage detected or by deciding the difference at the output voltage variation, and can maintain a stable light source by quickly altering the current in response to the voltage variation due to vibration of a discharge lamp.

A discharge lamp lighting apparatus in accordance with the present invention comprises a control unit that recognizes, for each polarity of an AC rectangular wave output, the output voltage detected with an output voltage detector, and carries out constant power control for each identical polarity.

According to the discharge lamp lighting apparatus in accordance with the present invention, it recognizes, for each polarity of the AC rectangular wave output, the output voltage detected with an output voltage detector, and carries out the constant power control for each identical polarity, so that it can carry out the constant power control positively even if there is a case where the output voltage differs for each polarity, thereby being able to prevent current feedback to the different polarity, and to prevent power oscillation and partial reduction of electrodes due to an increase of the output voltage difference for each polarity.

EMBODIMENTS FOR CARRYING OUT THE INVENTION

The best mode for carrying out the invention will now be described in detail with reference to the accompanying drawings.

Embodiment 1

Figure 1:
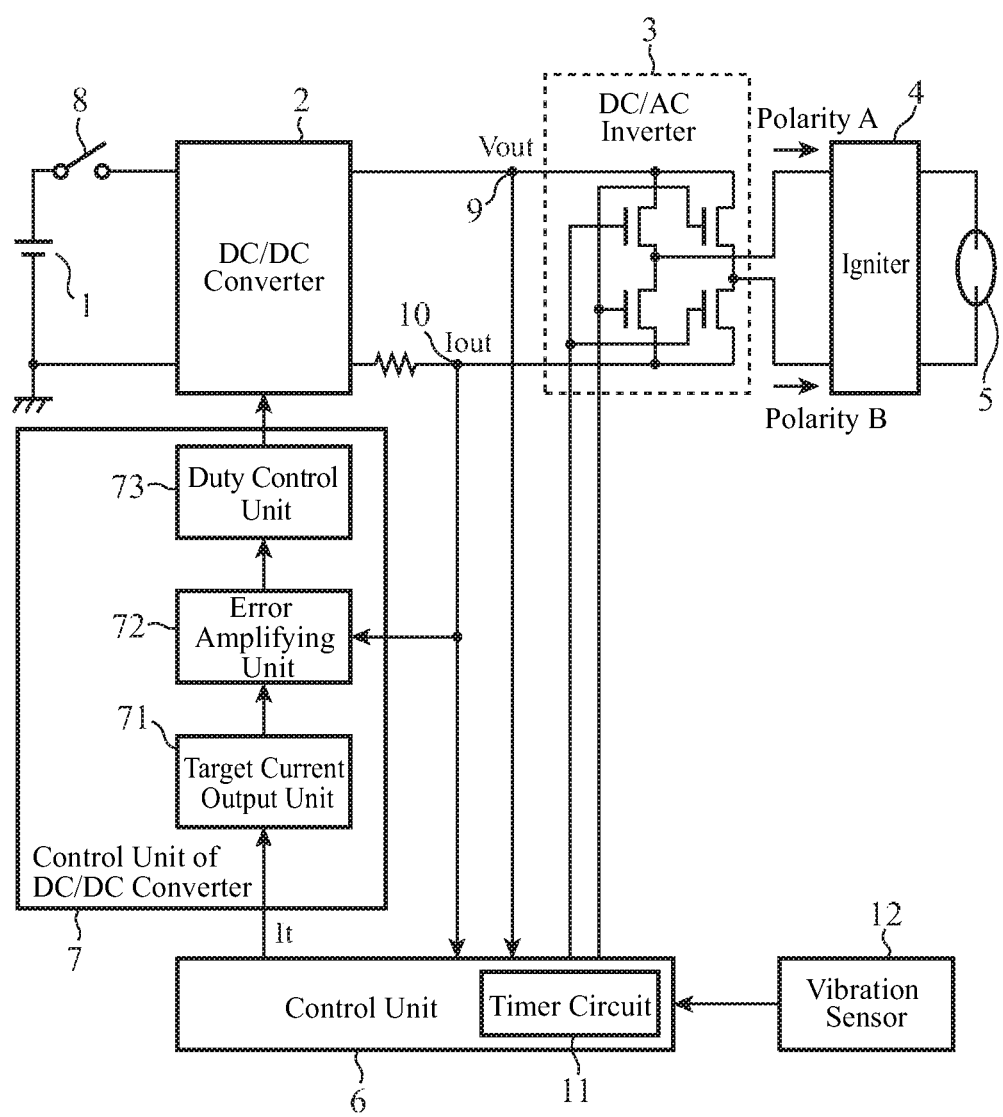
FIG. 1 is a block diagram showing a configuration of a discharge lamp lighting apparatus of an embodiment 1 in accordance with the present invention.

FIG. 1 is a block diagram showing a configuration of a discharge lamp lighting apparatus of an embodiment 1 in accordance with the present invention. The discharge lamp lighting apparatus comprises a DC power supply 1, a DC/DC converter 2, a DC/AC inverter 3, an igniter 4, a discharge lamp 5, a control unit 6, and a control unit 7 of the DC/DC converter 2.

The DC/DC converter 2 converts the DC voltage fed from the DC power supply 1 via a power supply switch 8 to a DC voltage of a high voltage and outputs it. The DC/AC inverter 3 converts the high DC voltage fed from the DC/DC converter 2 to an AC voltage and outputs it. The igniter 4 generates high voltage pulses from the AC voltage fed from the DC/AC inverter 3, and supplies the pulses to the discharge lamp 5 to cause dielectric breakdown for starting discharge.

The control unit 6 decides the polarity of the output voltage detected with a voltage detector 9, and determines a target current value It from the output voltage of the polarity. The control unit 7 of the DC/DC converter 2 comprises a target current output unit 71, an error amplifying unit 72 for detecting an error between the target current from the target current output unit 71 and a detection current the current detector 10 detects and for amplifying the error, and a duty control unit 73 for controlling the duty of the DC/DC converter 2 in accordance with the output of the error amplifying unit 72.

Next, the lighting operation of the discharge lamp 5 will be described. When the power supply switch 8 is closed and the DC voltage is supplied from the DC power supply 1 to the DC/DC converter 2, the DC/DC converter 2 converts the DC voltage to the high DC voltage according to the duty controlled by the duty control unit 73 of the control unit 7 and outputs it. On the other hand, the control unit 6 controls the DC/AC inverter 3 so that it converts the high DC voltage fed from the DC/DC converter 2 to the AC voltage and supplies it to the igniter 4. The igniter 4 generates a high voltage pulse from the AC voltage fed from the DC/AC inverter 3, supplies the pulse to the discharge lamp 5, and starts the discharge by bringing about the dielectric breakdown.

Figure 2:
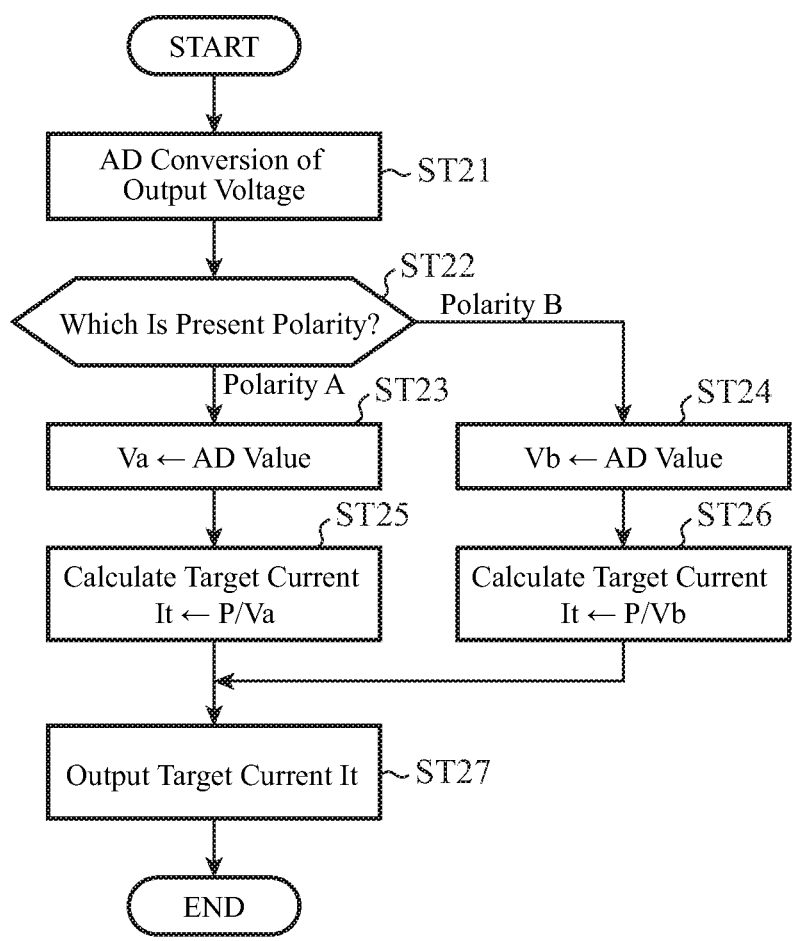
FIG. 2 is a flowchart showing the operation of a control unit.

The operation of the control unit 6 will be described with reference to the flowchart of FIG. 2. When it starts its operation, it controls the A/D conversion of the high DC voltage fed from the DC/DC converter 2 (step ST21). Subsequently, it decides the polarity of the voltage (step ST22), and if the polarity is A-pole, it substitutes the A/D conversion value into Va (step ST23), and if B-pole, it substitutes the A/D conversion value into Vb (step ST24). Then, it calculates the target current value It (P/Va or P/Vb) from the A/D conversion value Va or A/D conversion value Vb of each polarity (step ST25 or step ST26), supplies the target current value It calculated to the target current value output unit 71 of the control unit 7, and terminates the operation (step ST27).

As described above, according to the present embodiment 1, it detects the output voltage of each polarity separately and outputs the target current for each polarity so as to carry out the constant power control positively even if there is a case where the output voltage differs for each polarity, and prevents current feedback to the different polarity, thereby being able to prevent the power oscillation or partial reduction of the electrodes because of an increase of the output voltage difference for each polarity.

Embodiment 2

Figure 3:
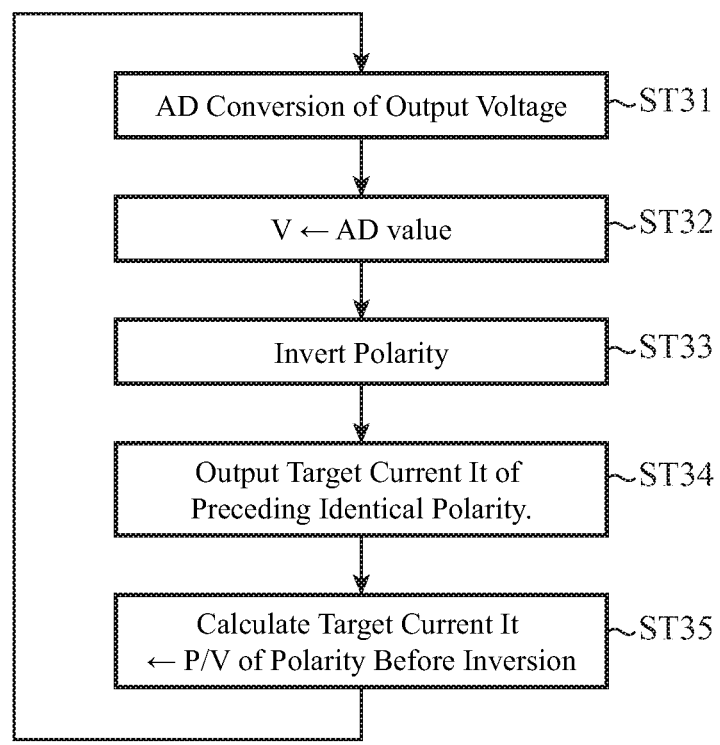
FIG. 3 is a flowchart showing the operation of a discharge lamp lighting apparatus of an embodiment 2 in accordance with the present invention.
Figure 4:
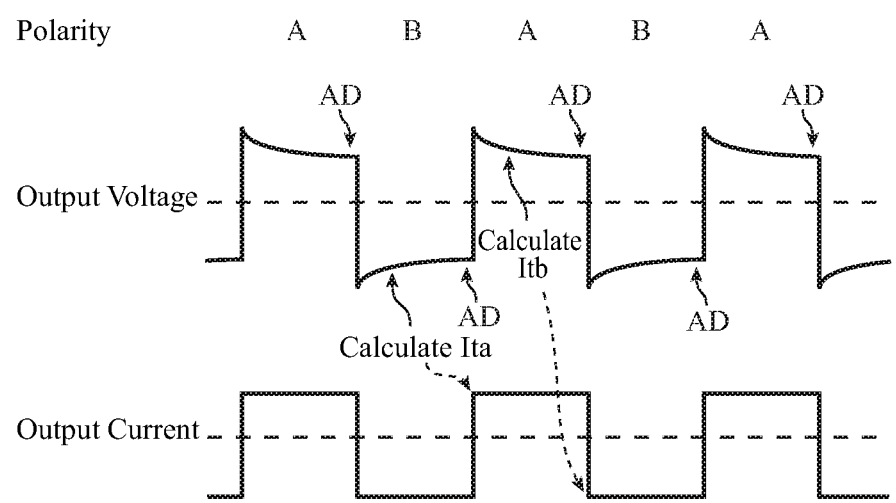
FIG. 4 is a diagram showing waveforms of output voltage and output current for polarities.

FIG. 3 is a flowchart showing the operation of a discharge lamp lighting apparatus of an embodiment 2 in accordance with the present invention. It carries out output voltage A/D conversion (step ST31), substitutes the A/D conversion value into V (step ST32), followed by inverting the polarity (step ST33). Then, it outputs the target current It it calculates from the output voltage of the identical polarity, which it calculates last time (step ST34), and calculates the target current It (P/V) of the polarity before inversion (step ST35). In this way, as shown in FIG. 4, the target current Ita for the polarity A is calculated from the last output voltage of the polarity A during the polarity B, and the target current It is output immediately after the polarity is switched to the polarity A, again.

As described above, according to the present embodiment 2, it sets the timing for detecting the output voltage from the voltage detector 9 at a time immediately before switching the polarity of the DC/AC inverter 3, and outputs the target current it calculates from the output voltage it detects for the identical polarity after one cycle onward. Accordingly, it avoids detecting the unstable voltage immediately after switching the polarity, and carries out the current feedback to the newest electrode voltage at the next cycle, thereby being able to implement the stable constant power control.

Embodiment 3

Figure 5:
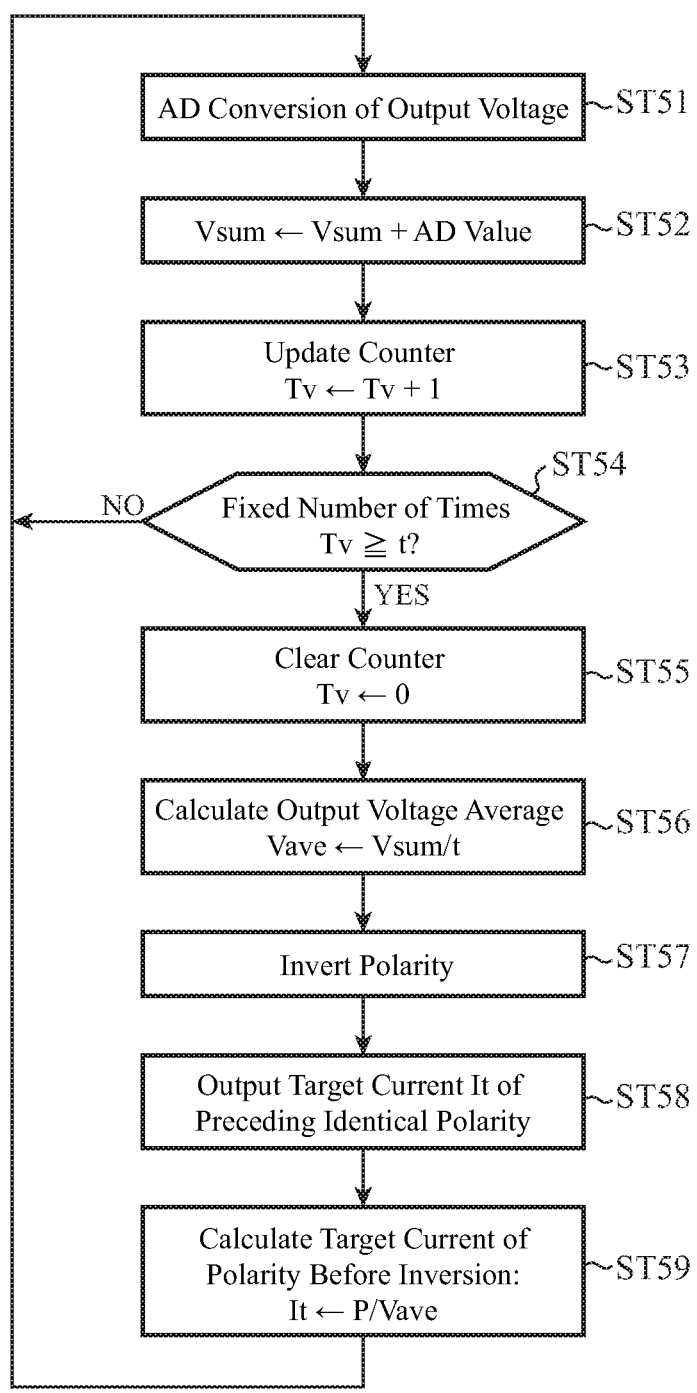
FIG. 5 is a flowchart showing the operation of a discharge lamp lighting apparatus of an embodiment 3 in accordance with the present invention.

FIG. 5 is a flowchart showing the operation of a discharge lamp lighting apparatus of an embodiment 3 in accordance with the present invention. It detects the output voltage a plurality of times per cycle, averages the output voltages detected for each polarity, calculates the target current from the average output voltage of each polarity, and carries out constant power control for each identical polarity.

First, it carries out the output voltage A/D conversion (step ST51), makes a substitution of Vsum←Vsum+A/D value (step ST52), adds one to the counter value Tv to update the counter value Tv (step ST53), then makes a decision as to whether the counter value Tv reaches a fixed number of times Tv≧t (step ST54), returns to step ST51 to repeat the foregoing operation when NO, and clears the counter (Tv←0) when YES (step ST55).

Subsequently, when it detects the output voltage by a prescribed number of times, it calculates the average output voltage Vave (Vave←Vsum/t) (step ST56), followed by inverting the polarity (step ST57), outputs the target current output It of the preceding identical polarity (step ST58), calculates the target current It of the polarity before inversion (It←P/Vave) (step ST59), and then returns to step ST51 to repeat the foregoing operation. Thus, it calculates the target current from the average output voltage before the polarity inversion, and outputs the target current it calculates from the average output voltage of the identical polarity, which it calculates last time.

According to the present embodiment 3, it reduces, even if noise is mixed into the detecting circuit of the output voltage, the effect of the noise by detecting the output voltage a plurality of times and by averaging them, thereby being able to prevent the discharge lamp from going out or the power fluctuations due to noise. In addition, as compared with an embodiment 4 which will be described later, since it completes the update of the average voltage within one cycle, it has an advantage of being able to quicken the feedback of the target current.

Embodiment 4

Figure 6:
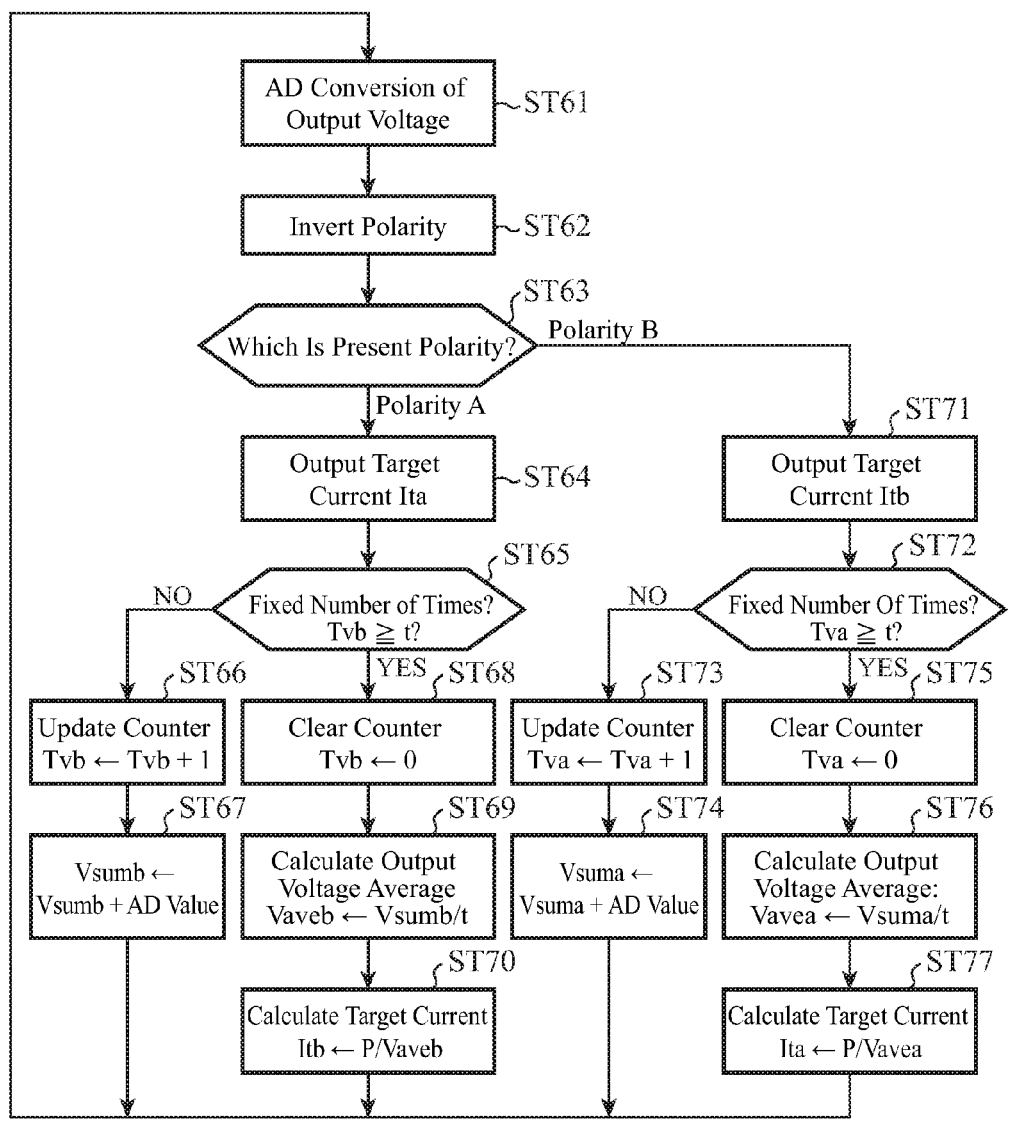
FIG. 6 is a flowchart showing the operation of a discharge lamp lighting apparatus of an embodiment 4 in accordance with the present invention.

FIG. 6 is a flowchart showing the operation of a discharge lamp lighting apparatus of an embodiment 4 in accordance with the present invention. It detects the output voltage per a plurality of cycles, averages the output voltages detected for each polarity, calculates the target current from the average output voltage of each polarity, and carries out constant power control for each identical polarity.

When the operation is started, it controls the DC/AC inverter 3 and carries out the output voltage A/D conversion for converting the high DC voltage fed from the DC/DC converter 2 to AC voltage (step ST61). Subsequently, it inverts the polarity of the output voltage (step ST62), and then decides the present polarity (step ST63). If the present polarity is the A-pole, it outputs the target current output Ita (step ST64), and makes a decision whether the count value reaches the fixed number of times (Tvb≧t) (step ST65). If the decision result is NO, it updates the counter (Tvb←Tvb+1) (step ST66) and makes a substitution of Vsumb←Vsumb+A/D conversion value (step ST67), followed by returning to the step ST61.

If the decision result at the foregoing step ST65 is YES, it clears the counter (Tvb←0) (step ST68), and then calculates the output voltage average (Vaveb←Vsumb/t) (step ST69). After that, it calculates the target current (Itb←P/Vaveb) from the output voltage average Vaveb (step ST70), and returns to step ST61.

On the other hand, if the decision result at step ST63 shows that the present polarity is the polarity B, the processing moves to the operation from step ST71 to step ST77 to carry out the same operation as that from the foregoing step ST64 to step ST70 concerning the polarity B.

Incidentally, although the discharge lamp lighting apparatus clears the counter every time it calculates the average output voltage, it can also calculate using the moving average.

As described above, according to the present embodiment 4, it inverts the polarity after detecting the output voltage, calculates the target current from the average output voltage after detecting the output voltage a prescribed number of times for each polarity, and outputs the target current it calculates from the average output voltage of the identical polarity, which it calculates last time. If the number of times of detecting the output voltage does not reach the prescribed number of times, it uses a provisional value or the target current it calculates from the preceding average output voltage. Accordingly, it can reduce the effect of noise even if it is mixed into the detecting circuit of the output voltage as in the embodiment 3. In addition, since the number of times of detecting the output voltage per cycle is less than that in the embodiment 3, the present embodiment can obviate the necessity of a high-processing-speed CPU or a control unit, thereby being able to construct a cheaper circuit.

In addition, although a filter is generally connected to the detecting circuit of the output voltage to avoid the effect of noise, it is possible that the detection value scarcely varies even if the output voltage detection is repeated at high speed as in the embodiment 3 depending on the time constant of the filter. Accordingly, the present embodiment 4 has the advantage of being able to calculate the average value for a broad range of data without being affected by the time constant of the filter by detecting intermittently every time the polarity is inverted.

Embodiment 5

Figure 7A:
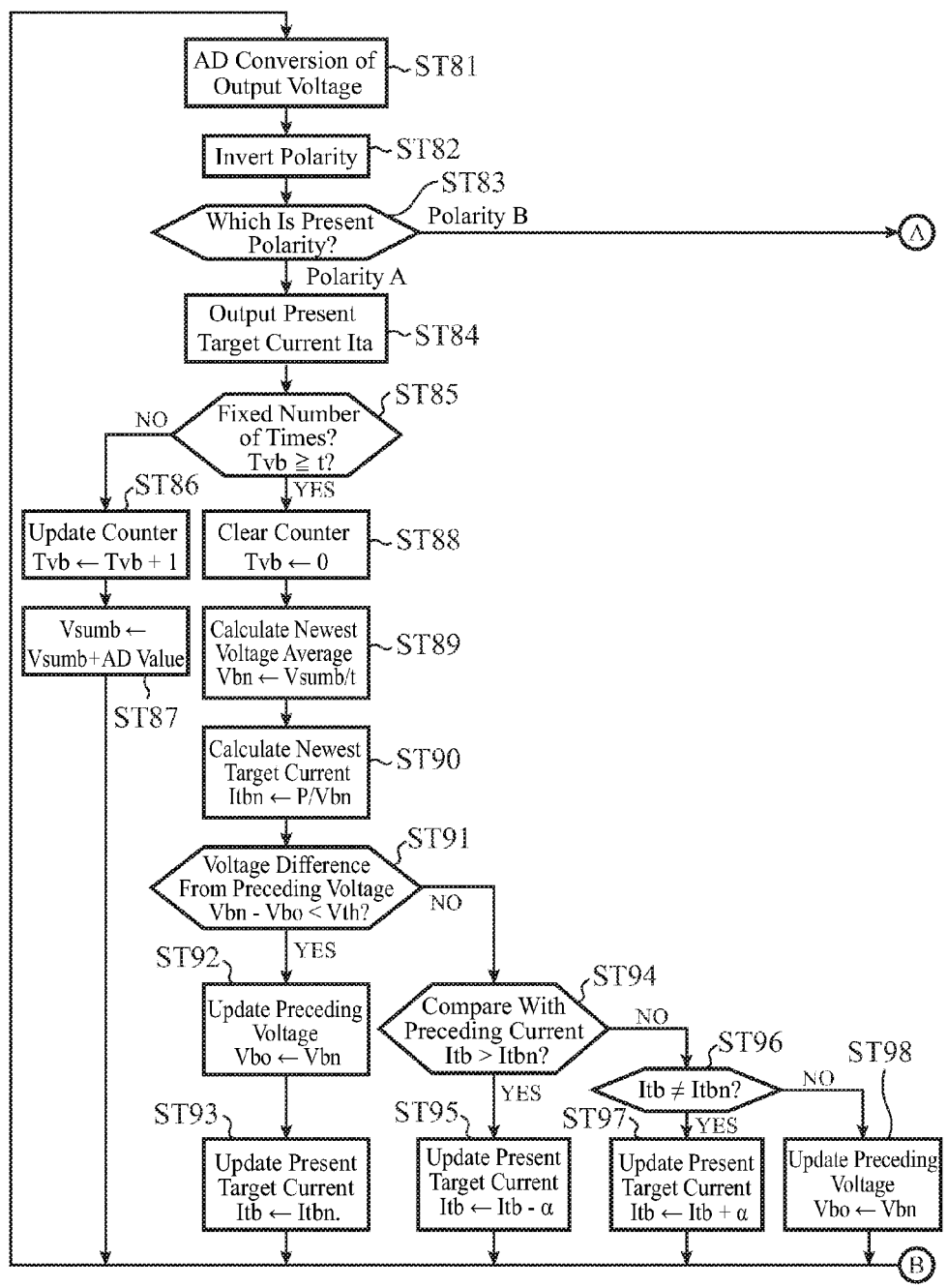
FIG. 7A is a flowchart showing the operation of a discharge lamp lighting apparatus of an embodiment 5 in accordance with the present invention.
Figure 7B:
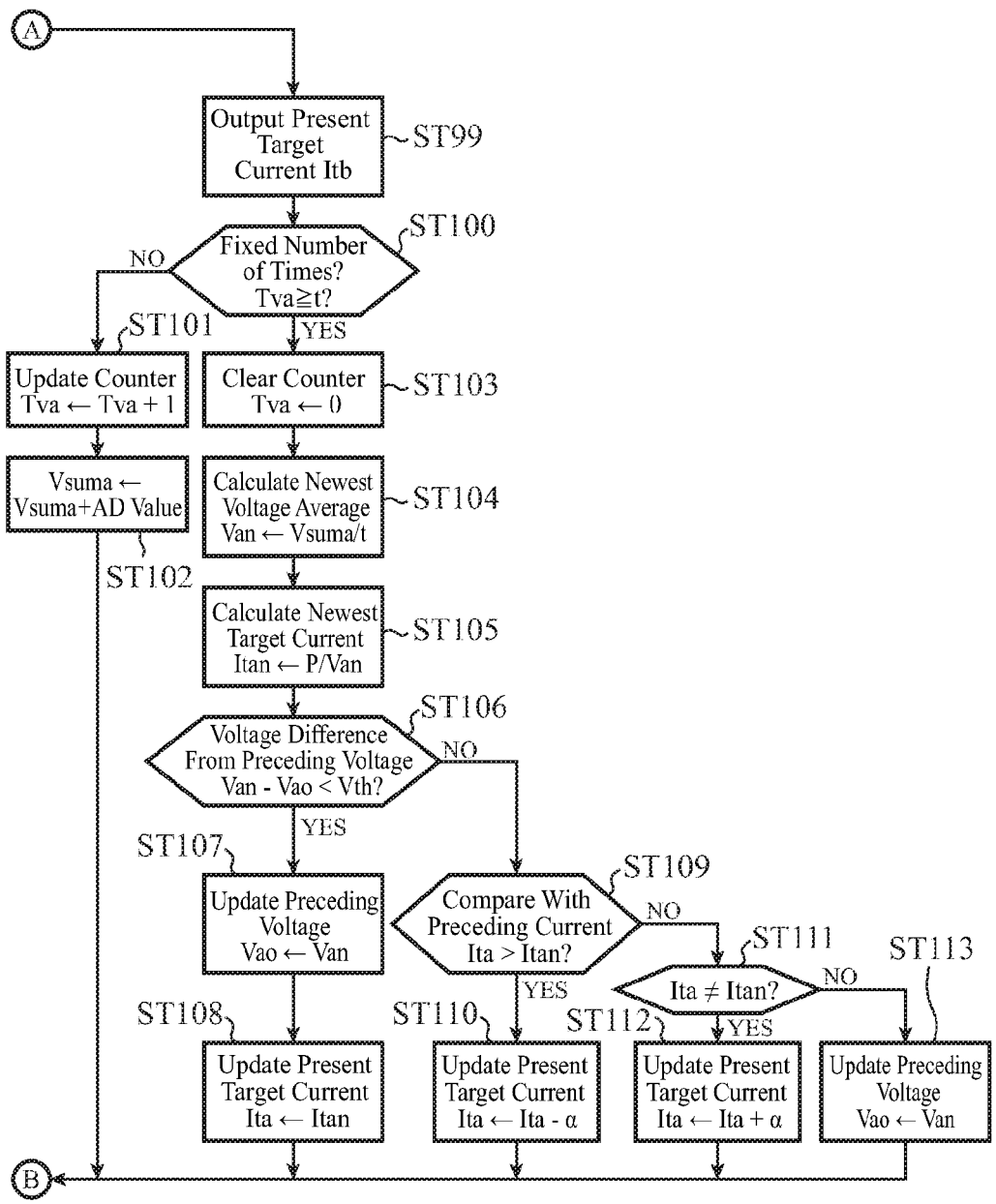
FIG. 7B is a flowchart showing the operation of the discharge lamp lighting apparatus of the embodiment 5 in accordance with the present invention.

FIG. 7A and FIG. 7B are flowcharts showing the operation of a discharge lamp lighting apparatus of an embodiment 5 in accordance with the present invention, in which since steps ST81 to ST88 are the same as the steps ST61 to ST68 of the flowchart describing the operation of the embodiment 4 shown in FIG. 6, duplicate explanation will be omitted here.

Then, at step ST89, it carries out the newest voltage average calculation (Vbn←Vsumb/t), followed by the newest target current calculation (Itbn←P/Vbn) at step ST90, and then makes a decision as to whether "the voltage difference from the preceding voltage Vbn−Vbo<prescribed value Vth" (step ST91). If the decision result is YES, it updates the preceding voltage Vbo←Vbn (step ST92), followed by updating the present target current Itb←Itbn (step ST93), and returns to step ST81.

If the decision result at the step ST91 is NO, it makes a decision of the preceding current comparison Itb>Itbn (step ST94). If the decision result is YES, it makes the present target current update Itb←Itb−α (step ST95), and returns to step ST81. If the decision result is NO, it makes a decision of Itb≠Itbn (step ST96). If the decision result is YES, it carries out the present target current update Itb←Itb+α (step ST97), and returns to step ST81. In contrast, if the decision result is NO, it carries out preceding voltage update Vbo←Vbn (step ST98), and then returns to step ST81. Incidentally, the variation limit α can be fixed or changed in accordance with the difference between the present and newest target currents or in accordance with the lighting length.

On the other hand, when a decision is made at step ST83 that the present polarity is B, it executes the operation from step ST99 to step ST113 shown in FIG. 7B, which is the same as that from step ST84 to step ST98 in FIG. 7A, and duplicate explanation thereof will be omitted here.

As described above, according to the present embodiment 5, it calculates, after calculating the target current, the difference between the present output voltage and the preceding output voltage stored in a memory or the like, outputs, if the difference<prescribed value, the newest target current without change, and outputs, if the difference≧prescribed value, the newest target current on which the variation limit α is imposed. Accordingly, when the difference≧prescribed value, it alters the present target current up to the newest target current step by step by the limit value per any given period, thereby being able to change the target current slowly.

As a result, if abnormal discharge occurs, it can alter the output current slowly, and if the discharge lamp vibrates, it can alter the output current quickly. If abnormal discharge occurs, the output voltage alters 10 V or more in general. If the discharge lamp vibrates, although the variation in the output voltage is in proportion to the intensity of the vibration, it alters by about 5 V in general. For example, by setting the prescribed value at any value between 5 V and 10 V, and if the output voltage varies not less than the prescribed value, it can recover from the abnormal discharge by slowly altering the illuminance at the abnormal discharge by changing the target current slowly. In addition, as for noise, slowly altering the illuminance has an advantage of preventing the lighting from going out. At the same time, as for the output voltage variation less than the prescribed value, quickly altering the target current makes it possible to maintain the constant power control even at the discharge lamp vibration, and to prevent the illuminance variation. In addition, as compared with an embodiment 6 which will be described below, the present embodiment 5 has no concern for heating due to maintaining overpowering, and as compared with an embodiment 7 which will be described later, it has an advantage of not requiring a timer.

Embodiment 6

Figure 8A:
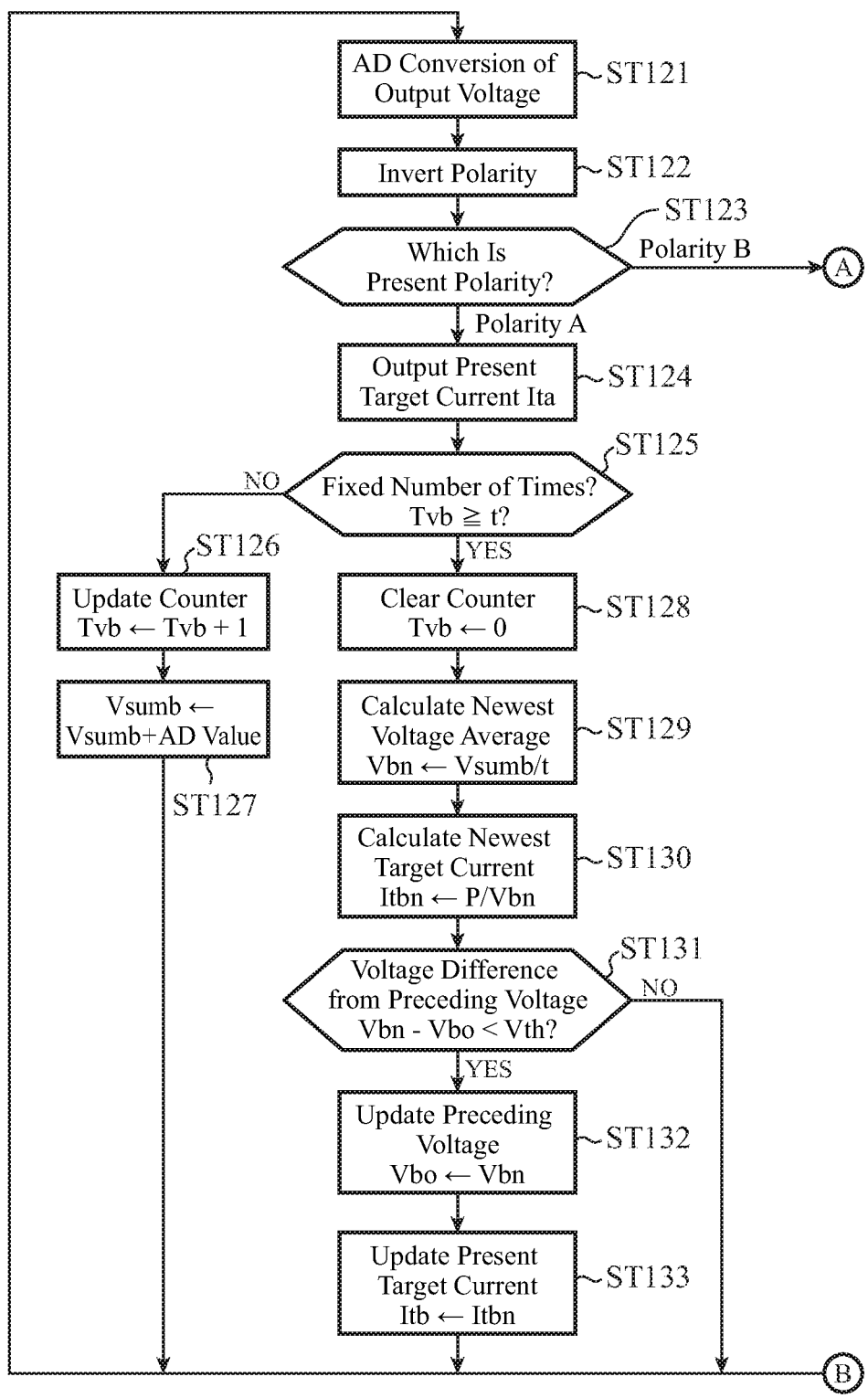
FIG. 8A is a flowchart showing the operation of a discharge lamp lighting apparatus of an embodiment 6 in accordance with the present invention.
Figure 8B:
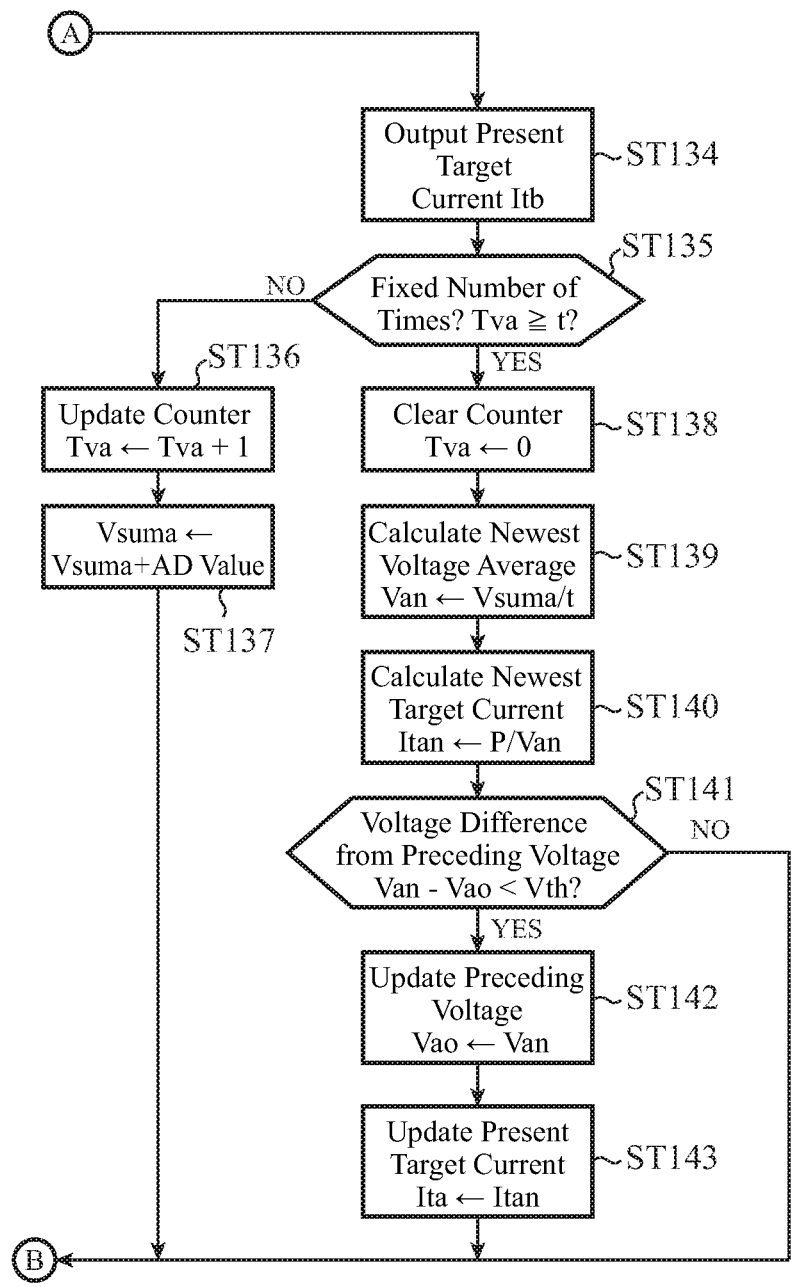
FIG. 8B is a flowchart showing the operation of the discharge lamp lighting apparatus of the embodiment 6 in accordance with the present invention.

FIG. 8A and FIG. 8B are flowcharts showing the operation of a discharge lamp lighting apparatus of an embodiment 6 in accordance with the present invention, in which since the operation from step ST121 to ST133 of FIG. 8A is the same as the operation from step ST81 to ST93 of the flowchart describing the operation of the embodiment 5 shown in FIG. 7A, duplicate explanation will be omitted here.

Then, the present embodiment 6 decides at a decision operation step ST131 as to whether "the voltage difference from the preceding voltage Vbn−Vbo<prescribed value Vth", and if the decision result is NO, it maintains the target current it calculates from the stored output voltage and outputs it. In other words, if the difference<prescribed value, it outputs the newest target current without change, and if the difference prescribed value, it maintains the present target current and outputs it.

On the other hand, when a decision is made at step ST123 that the present polarity is B, it executes the operation from step ST134 to step ST143 shown in FIG. 8B, which is the same as the operation from step ST124 to step ST133 in FIG. 8A, and duplicate explanation thereof will be omitted.

As described above, according to the present embodiment 6, it can prevent the illuminance variation due to the abnormal discharge or noise more effectively than the embodiment 5 by not altering the target current when the output voltage variation is not less than the prescribed value.

Embodiment 7

Figure 9A:
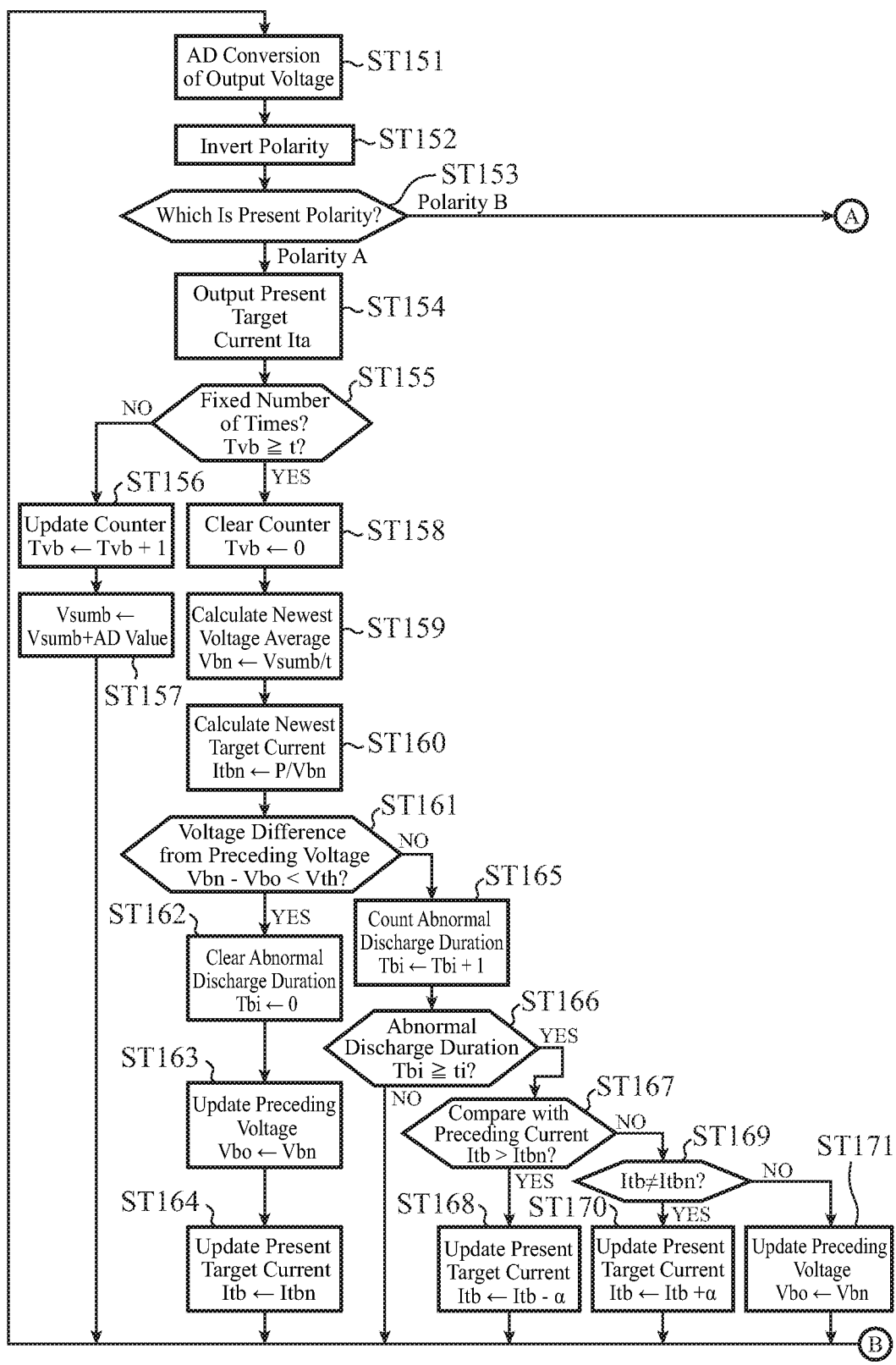
FIG. 9A is a flowchart showing the operation of a discharge lamp lighting apparatus of an embodiment 7 in accordance with the present invention.
Figure 9B:
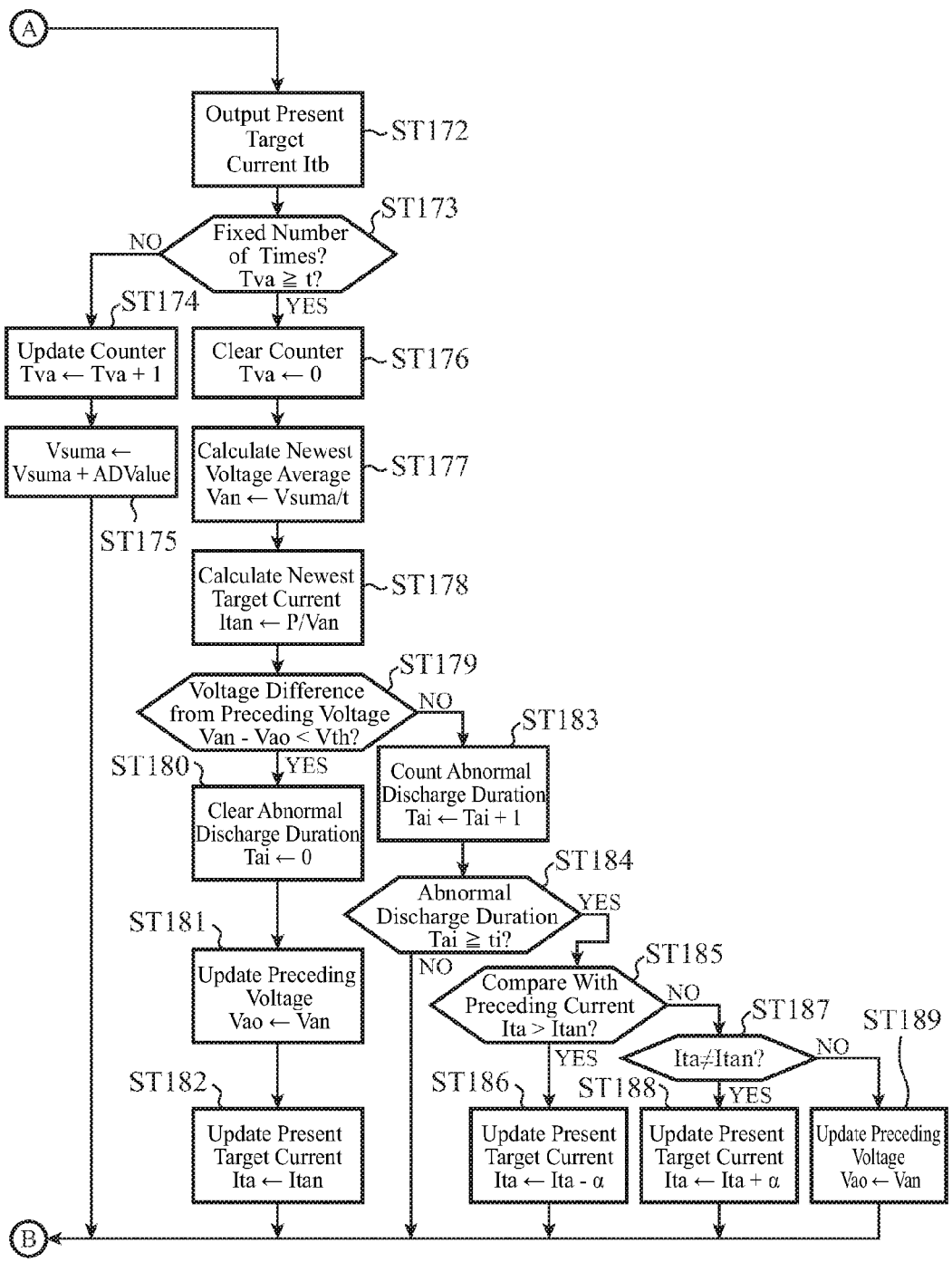
FIG. 9B is a flowchart showing the operation of the discharge lamp lighting apparatus of the embodiment 7 in accordance with the present invention.

FIG. 9A and FIG. 9B are flowcharts showing the operation of a discharge lamp lighting apparatus of an embodiment 7 in accordance with the present invention, in which since the operation from step ST151 to ST161 of FIG. 9A is the same as the operation from step ST121 to ST131 of the flowchart describing the operation of the embodiment 6 shown in FIG. 8A, duplicate explanation thereof will be omitted here.

Then, the present embodiment 7 decides at step ST161 as to whether "the voltage difference from the preceding voltage Vbn−Vbo<prescribed value Vth", and if the decision result is YES, it clears the abnormal discharge duration (Tbi←0) at step ST162, carries out the preceding voltage update Vbo←Vbn (step ST163), followed by performing the present target current update Itb←Itbn (step ST164), and returns to step ST151.

If the decision result at step ST161 is NO, it counts the abnormal discharge duration (Tbi←Tbi+1) (step ST165), decides whether the abnormal discharge duration Tbi≧ti (step ST166), returns to step ST151 if the decision result is NO, and proceeds, if it is YES, to making a preceding current comparison Itb>Itbn (step ST167). If the decision result at this step ST167 is YES, it makes the present target current update Itb←Itb−α (step ST168), and returns to step ST151. If it is NO, it decides whether Itb≠Itbn (step ST169), and if the decision result is YES, it makes the present target current update Itb←Itb+α (step ST170), and returns to step ST151. If it is NO, it makes the preceding voltage update Vbo←Vbn (step ST171), and returns to step ST151.

Incidentally, as for the operation from step ST172 to ST189 in FIG. 9B in the case where the decision result at step ST153 is B-pole, since it is the same as the operation from step ST154 to ST171 shown in FIG. 9A, the duplicate explanation thereof will be omitted here.

The present embodiment 7 has the timer circuit 11 that counts the period of time during which it maintains the target current before the output voltage variation, and if the period of time exceeds a prescribed period of time, it provides the variation limit to the target current it calculates from the present output voltage and outputs. Incidentally, as for the timer circuit 11, one incorporated in the control unit 6 is utilized. Alternatively, a dedicated timer circuit can be provided separately.

As for the period of time during which the output voltage difference<prescribed value, if the timer counts it and if it is less than the prescribed period of time, the present embodiment maintains and outputs the present target current, and if the period of time exceeds the prescribed period of time, it outputs the newest target current on which the variation limit is imposed. Thus, if the difference≧prescribed value continues, it maintains the present target current for a fixed period of time, and then slowly alters the target current.

As described above, there are some cases where the abnormal discharge does not recover even if the target current is maintained during the abnormal discharge, and the embodiment 6 is likely to output high power which can result in overheating. According to the present embodiment 7, however, since it counts the period of time of the abnormal discharge, maintains the target current up to the prescribed period of time, and slowly reduces the target current if the abnormal discharge does not recover even if the prescribed period of time has elapsed, it can prevent overheating due to continuing high power output.

Embodiment 8

Figure 10A:
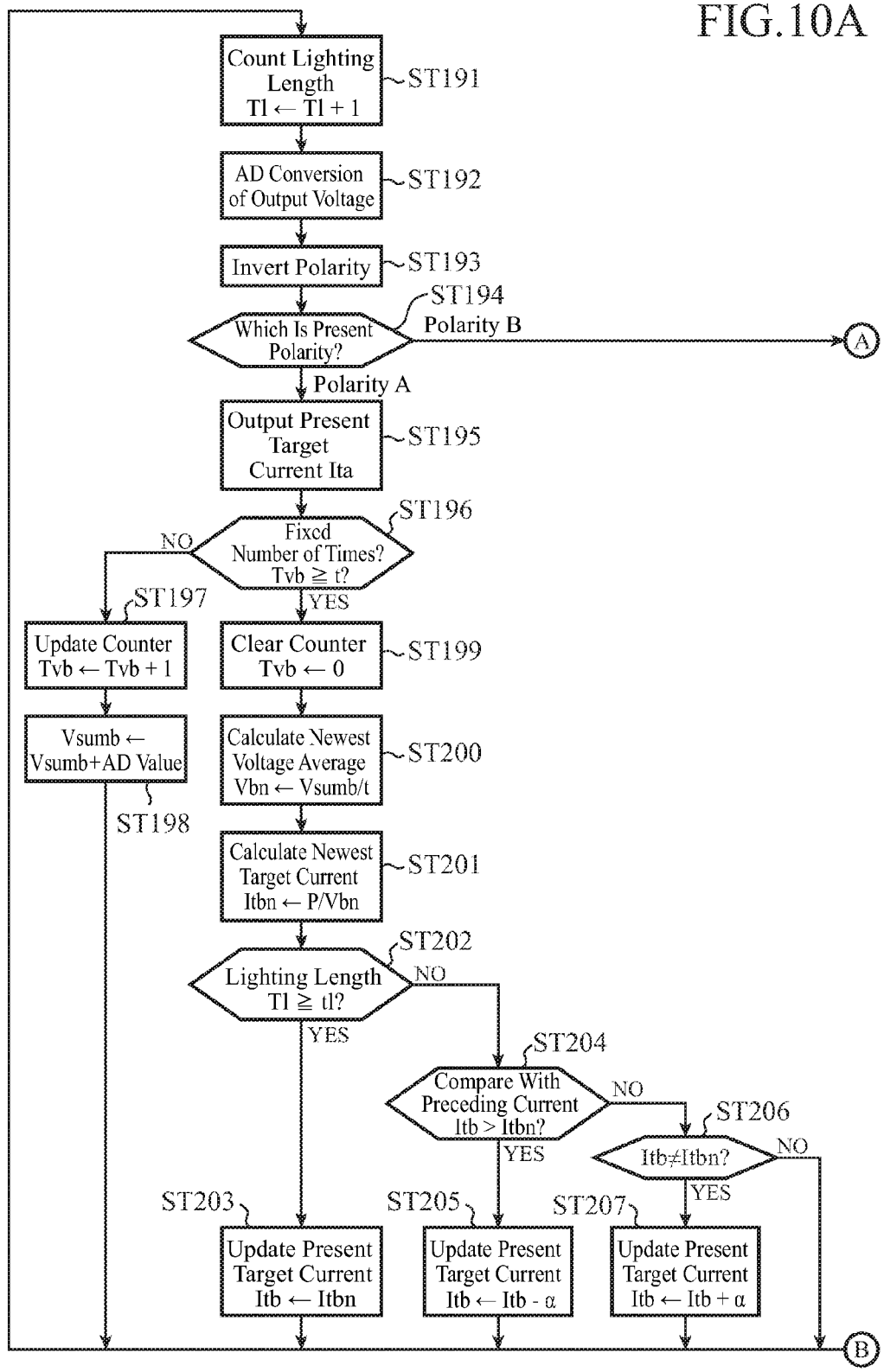
FIG. 10A is a flowchart showing the operation of a discharge lamp lighting apparatus of an embodiment 8 in accordance with the present invention.
Figure 10B:
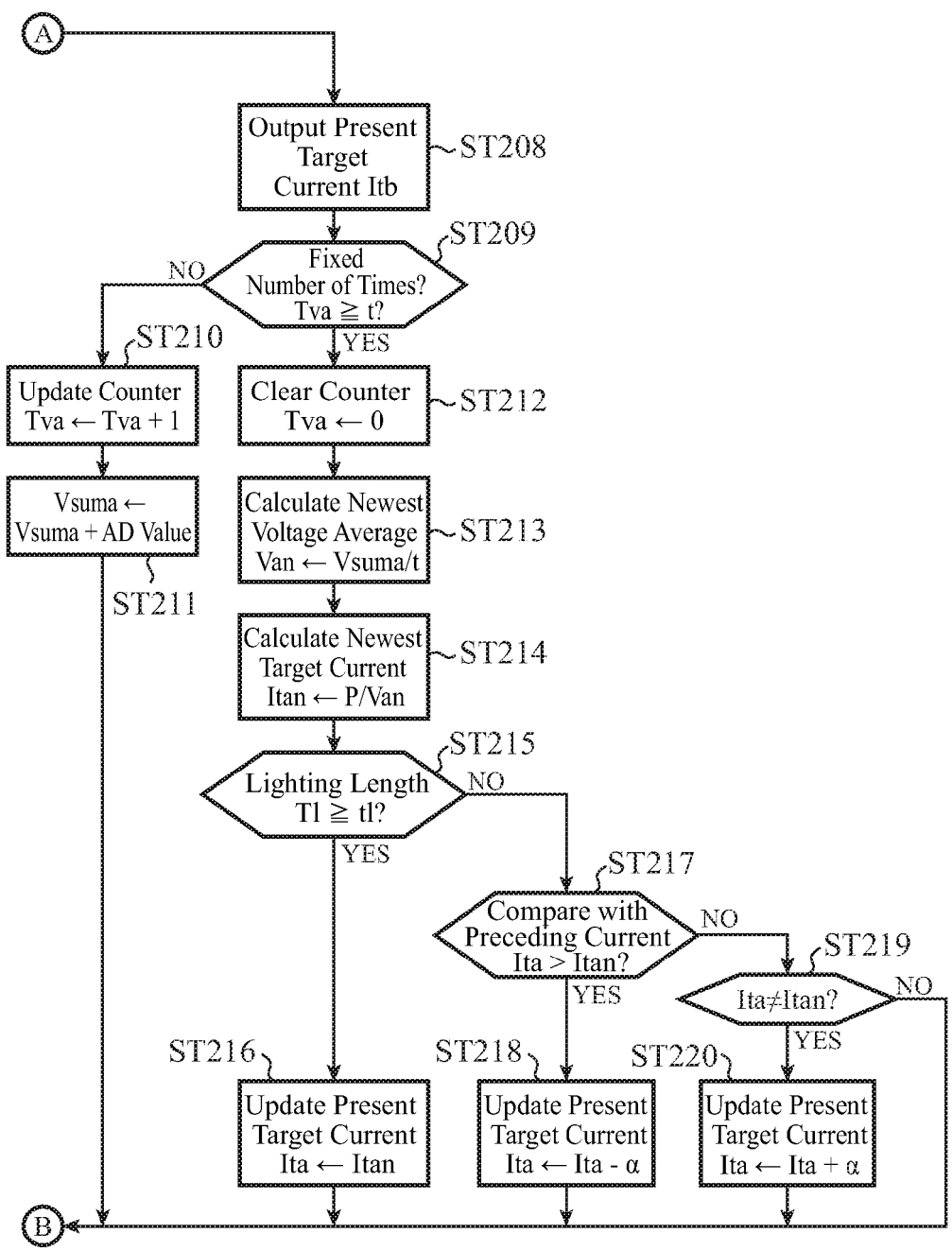
FIG. 10B is a flowchart showing the operation of the discharge lamp lighting apparatus of the embodiment 8 in accordance with the present invention.

FIG. 10A and FIG. 10B are flowcharts showing the operation of a discharge lamp lighting apparatus of an embodiment 8 in accordance with the present invention, in which the operation from step ST192 to step ST201 after counting the lighting length Tl←Tl+1 at step ST191 shown in FIG. 10A is the same as the operation from step ST151 to step ST160 of the flowchart of the embodiment 7 shown in FIG. 9A, and hence the duplicate explanation thereof will be omitted here.

Then, it makes a decision at step ST202 as to whether the lighting length Tl≧tl, and if the decision result is YES, it carries out the present target current update Itb←Itbn and returns to step ST191. If the decision result is NO, the processing proceeds to making the preceding current comparison Itb>Itbn (step ST204). If the decision result at step ST204 is YES, it carries out the present target current update Itb←Itb−α (step ST205), and returns to step ST191. In contrast, if the decision result is NO, it makes a decision as to whether Itb≠Itbn (step ST206). If the decision result is YES, it carries out the present target current update Itb←Itb+α (step ST207), and if the decision result is NO, it returns to step ST191 directly.

Thus, when the time elapsed after turning on the discharge lamp is less than the prescribed period of time, the variation limit is imposed on the target current for the output voltage variation, and releases the variation limit in the target current after the prescribed period of time has elapsed. In other words, if the lighting length<prescribed value, it imposes the variation limit on the newest target current and outputs, and if the lighting length≧prescribed value, it outputs the newest target current without change.

Incidentally, as for the operation from step ST208 to ST220 in FIG. 10B when the decision result at step ST194 is B-pole, since it is the same as the operation from step ST195 to step ST207 in FIG. 10A, duplicate explanation thereof will be omitted here.

As described above, according to the present embodiment 8, the state variation of the arc such as shifting from the diffusion mode to spot mode is apt to occur during a transient condition in which the conditions in the light-emitting tube are not yet stable. The variation in the output voltage due to the state variation of the arc is usually low such as 1-2 V, and is hardly discriminable from the variation in the output voltage due to vibration of the discharge lamp. Discriminating the transient condition of the discharge lamp according to the lighting length makes it possible to quickly varying the target current against the vibration in a stable state, and to slowly altering the target current against the state variation of the arc occurring in the transient condition, thereby being able to make the illuminance variation less conspicuous.

Embodiment 9

Figure 11A:
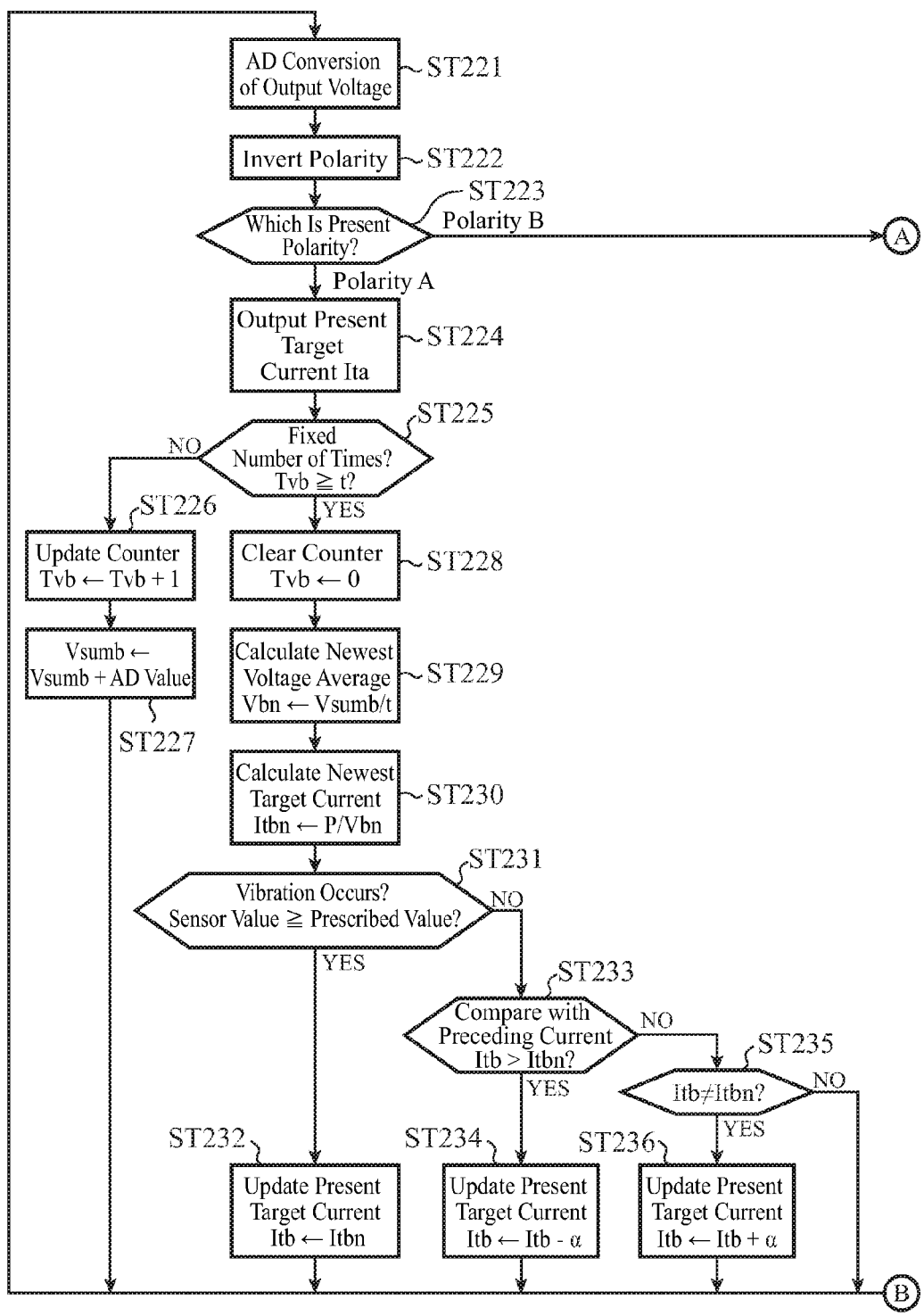
FIG. 11A is a flowchart showing the operation of a discharge lamp lighting apparatus of an embodiment 9 in accordance with the present invention.
Figure 11B:
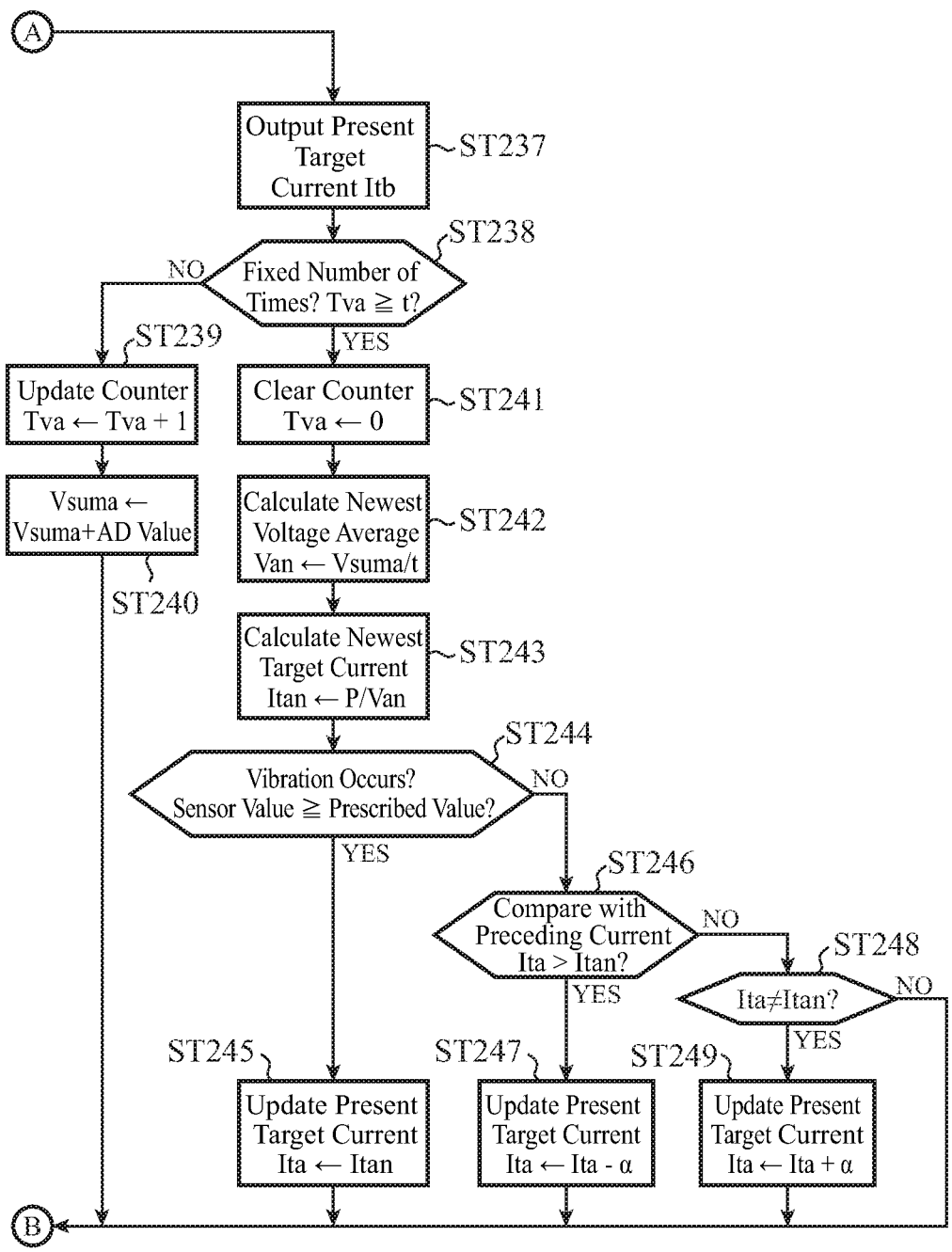
FIG. 11B is a flowchart showing the operation of the discharge lamp lighting apparatus of the embodiment 9 in accordance with the present invention.

FIG. 11A and FIG. 11B are flowcharts showing the operation of a discharge lamp lighting apparatus of an embodiment 9 in accordance with the present invention, in which the operation from step ST221 to step ST230 shown in FIG. 11A is the same as the operation from step ST192 to step ST201 in the flowchart of FIG. 10A describing the operation of the embodiment 8, and the duplicate explanation thereof will be omitted here.

Then, it makes a decision at step ST231 as to whether the vibration sensor 12 detects vibration not less than a prescribed value (detection value of the vibration sensor≧prescribed value). If the decision result is YES, it carries out at step ST232 the present target current update Itb←Itbn and returns to step ST221. If the decision result is NO, it proceeds to making the preceding current comparison Itb>Itbn (step ST233). If the decision result at step ST233 is YES, it makes the present target current update Itb←Itb−α (step ST234), and returns to step ST221. In contrast, if the decision result is NO, it decides whether Itb≠Itbn (step ST235), and if YES, it makes the present target current update Itb←Itb+α (step ST236), and if NO it returns to step ST221 directly.

Thus, when the vibration sensor detection value≧prescribed value, it outputs the newest target current, and when the vibration sensor detection value<prescribed value, it outputs the newest target current on which the variation limit is imposed. Incidentally, as for the operation from step ST237 to step ST249 of FIG. 11B when the decision result at step ST223 is the B-pole, since it is the same as the operation from step ST224 to step ST236 of FIG. 11A, the duplicate description thereof will be omitted here.

The foregoing embodiments 5-7 discriminate the abnormal discharge or noise from the vibration of the discharge lamp according to the variation of the output voltage. The output voltage variation at the vibration, however, is in proportion to the intensity of the vibration, and hence the output voltage variation can sometimes exceed the prescribed value depending on the intensity of the vibration. In addition, there is a possibility that even the abnormal discharge or noise can change the output voltage by only an amount less than the prescribed value. In addition, the embodiment 8 discriminates the state variation of the arc from the vibration of the discharge lamp according to the lighting length. However, even if the lighting length<prescribed value, there is some possibility that the discharge lamp vibrates.

As described above, according to the present embodiment 9, it has the vibration sensor in the lighting apparatus so that when the lighting apparatus placed near the discharge lamp undergoes vibration in the same manner as the discharge lamp vibrates, it quickly alters the target current positively for the voltage variation due to the vibration. In contrast, as for the phenomena other than the vibration such as the abnormal discharge, noise or the state variation of the arc, it maintains or slowly alters the target current. Thus, it can implement reliable constant power control.

Incidentally, as for letters A and B in a circle in FIG. 7A and FIG. 7B-FIG. 11A and FIG. 11B denote connecting points between FIG. 7A and FIG. 7B, FIG. 8A and FIG. 8B, FIG. 9A and FIG. 9B, FIG. 10A and FIG. 10B, and FIG. 11A and FIG. 11B.

INDUSTRIAL APPLICABILITY

A discharge lamp lighting apparatus in accordance with the present invention detects the output voltage for each polarity, carries out the constant power control for each identical polarity. Accordingly, it is suitable for lighting a discharge lamp (HID) driven by a AC rectangular wave reliably.

What is claimed is:
1. A discharge lamp lighting apparatus comprising:
a DC/DC converter for boosting voltage fed from a DC power supply;
a DC/AC inverter for converting output of the DC/DC converter to an AC rectangular wave and supplies it to a discharge lamp;
an output voltage detector for detecting voltage applied to the discharge lamp; and
a control unit for controlling the DC/DC converter and the DC/AC inverter for supplying appropriate power to the discharge lamp, wherein
the control unit discriminates, for each polarity of the AC rectangular wave output, the output voltage the output voltage detector detects, and carries out constant power control for each identical polarity.
2. The discharge lamp lighting apparatus according to claim 1, wherein timing for detecting the output voltage from the output voltage detector is immediately before switching the polarity for the DC/AC inverter, and output of a target current calculated from the output voltage detected is carried out for the identical polarity from a next cycle onward.
3. The discharge lamp lighting apparatus according to claim 1, which carries out the constant power control for each identical polarity by detecting the output voltage a plurality of times per cycle, by averaging the output voltage detected for each polarity separately, and by calculating a target current from the average output voltage of each polarity.
4. The discharge lamp lighting apparatus according to claim 1, which carries out the constant power control for each identical polarity by detecting the output voltage in a plurality of cycles, by averaging the output voltage detected for each polarity separately, and by calculating a target current from the average output voltage of each polarity.
5. The discharge lamp lighting apparatus according to claim 1, further comprising a storage device for storing the output voltage detected, wherein the discharge lamp lighting apparatus calculates a difference between the output voltage stored and the output voltage one cycle ahead; outputs, when the difference is less than a prescribed value, a target current calculated from the output voltage one cycle ahead without a variation limit; and outputs, when the difference is not less than the prescribed value, the target current which is calculated from the output voltage one cycle ahead and is provided with the variation limit.
6. The discharge lamp lighting apparatus according to claim 1, further comprising a storage device for storing the output voltage detected, wherein the discharge lamp lighting apparatus calculates a difference between the output voltage stored and the output voltage one cycle ahead; outputs, when the difference is less than a prescribed value, a target current calculated from the output voltage one cycle ahead without a variation limit; and maintains and outputs, when the difference is not less than the prescribed value, the target current calculated from the output voltage stored.
7. The discharge lamp lighting apparatus according to claim 6, further comprising a timer circuit, wherein the discharge lamp lighting apparatus causes the timer circuit to count a period of time during which it maintains the target current before an output voltage variation; and outputs, when the period of time during which it maintains the target current before the output voltage variation exceeds a prescribed period of time, the target current which is calculated from the present output voltage and is provided with the variation limit.
8. The discharge lamp lighting apparatus according to claim 1, which provides, when time elapsed from turning on the discharge lamp is less than a prescribed period of time, a variation limit to the target current corresponding to the output voltage variation; and releases the variation limit to the target current when the time elapsed from turning on the discharge lamp exceeds the prescribed period of time.
9. The discharge lamp lighting apparatus according to claim 1, further comprising a vibration sensor, wherein when the vibration sensor detects vibration not less than a prescribed value, the discharge lamp lighting apparatus removes a variation limit from the target current, and provides the variation limit to the target current when the vibration sensor detects vibration less than the prescribed value.

* * * * *